March 21, 1950          K. K. LEONG          2,501,061
SALT AND PEPPER SHAKER
Filed March 17, 1947
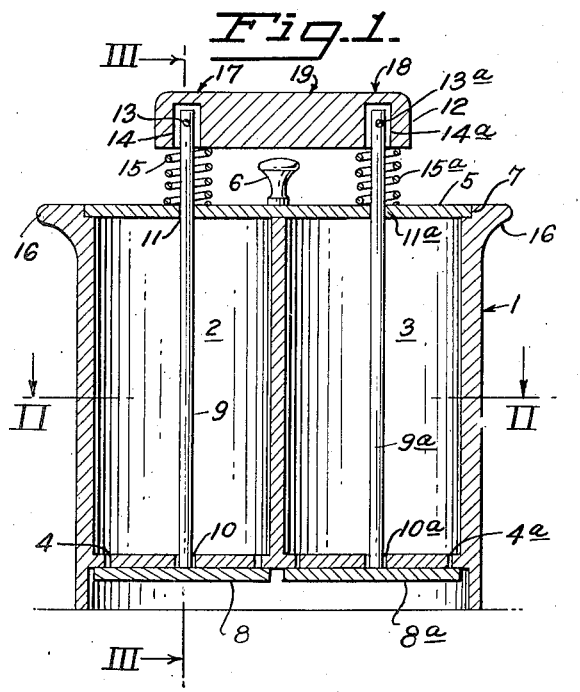
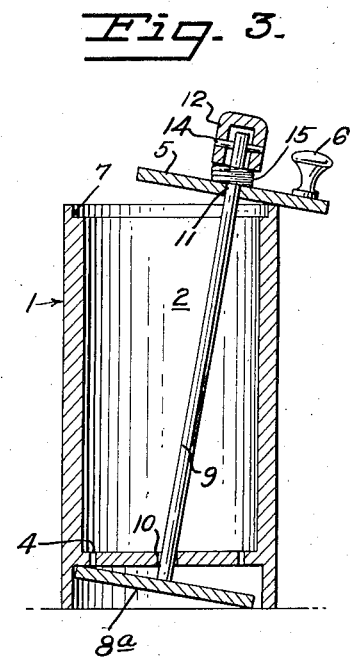
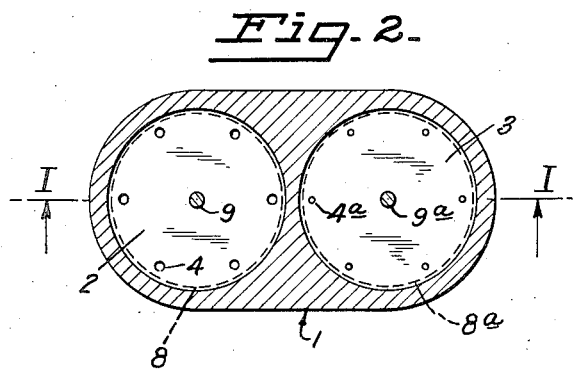
INVENTOR.
KIM KEE LEONG
BY
Thomas Castberg
ATTORNEY Patented Mar. 21, 1950

2,501,061

UNITED STATES PATENT OFFICE 2,501,061

SALT AND PEPPER SHAKER

Kim Kee Leong, San Francisco, Calif.

Application March 17, 1947, Serial No. 735,189

2 Claims. (Cl. 65—45)

This invention relates to a shaker for condiments, and refers more particularly to a combination shaker capable of shaking, for example, salt and pepper simultaneously.

The specific embodiment of the present invention resides in the construction of a multi-compartmental shaker that can be operated to emit, for example, salt from one compartment, and pepper from a second compartment, either separately or simultaneously.

The body portion of the shaker is composed of two compartments opened at one end and closed at the other end, the closed end having perforations formed therein through which granular material may pass, the other end of said body portion being closed by a cover member. Each compartment has a disc valve covering its perforated end, said valve having a slidable stem attached thereto which passes through a hole in the perforated end, then through the compartment, and through a hole in the cover member that is in alignment with the stem hole in the perforated end. The stems are pivotally attached to a bar. On the stem and between the cover member and the bar is a spring that forces the bar, stem and disc valve in an upward direction setting the valve against the perforations at the opposite end of the body member, thus preventing the granular material contained in the compartments from flowing out. The lever member can be operated to open one or the other of the valves separately, or both of the valves simultaneously. By its operation the operator can secure, for example, either salt or pepper or a combination of salt and pepper.

In the drawings:

Fig. 1 is a side elevation view showing the body member, cover and the position of the valves, valve stems, spring and bar;

Fig. 2 is a sectional view along the line II—II of Fig. 1 showing the bottom of the body member; and Fig. 3 is a sectional view along the line III—III of Fig. 1 showing the cover member disengaged so that the compartments can be filled with a condiment.

Referring to the drawings in detail, I designates a body of the shaker having compartments 2 and 3, one end of each compartment being opened, and the other being closed and having perforations 4 and 4a formed therein to permit granular material to flow through. A cover member 5 has a handle 6 by which said cover may be disengaged vertically and laterally as shown in Fig. 3 from its seat 7 formed in the top of the body 1 permitting the compartments to be filled with the desired condiment. By lifting the cover 5 vertically, springs 15 and 15a would be compressed against a bar 12 thereby permitting tilting of valve stems 9 and 9a and valves 8 and 8a, with the result that the cover 5 can be moved laterally opening the compartments 2 and 3 for purposes of filling. The perforations 4 and 4a are normally covered or closed by the disc valves 8 and 8a. Said disc valves have attached thereto the stems 9 and 9a which pass through the perforated end of a compartment at 10 and 10a and aligned holes 11 and 11a in the cover member 5, the stems 9 and 9a being pivotally attached to the bar 12 by pins 13 and 13a. Openings 14 and 14a in the bar 12 are of a size sufficient to permit the bar 12 to be depressed at one end thereof and not bind on the stem at the other end thereof. The valves 8 and 8a are kept in a normally closed or seated position by springs 15 and 15a placed on the stems 9 and 9a between the cover member 5 and the bar 12, said springs forcing the bar 12, the stems 9 and 9a and the attached valves 8 and 8a upwardly in relation to the body member, thus seating said valves 8 and 8a tightly against the perforations 4 and 4a in the body 1.

To operate the shaker, assume that salt is in compartment 2 and pepper in compartment 3. The user desiring salt would grasp the body member 1 under a shoulder 16 placing his thumb on the bar 12 and press down on said bar 12 at a point indicated at 17. This would contract the spring 15 and force the stem 9 downward, and the valve 8 would become unseated from the perforations 4 permitting salt to flow through said perforations 4. The valve 8a would remain seated due to the upward pressure of the spring 15a. If the user desired pepper, he would merely depress the bar at a point indicated at 18, the spring 15a would be contracted, the stem 9a would be moved downwardly resulting in the unseating of the valve 8a from the perforations 4a. If both salt and pepper are desired, the user would depress the bar 12 by applying pressure at a point indicated at 19 resulting in both the springs 15 and 15a being depressed, the stems 9 and 9a moving downwardly, unseating the valves 8 and 8a from the perforations 4 and 4a, permitting both salt and pepper to flow from the respective compartments 2 and 3.

The device described can be made from wood, plastic or other suitable materials.

While certain features of the present invention are more or less specifically described, I wish it understood that various changes may be resorted to within the scope of the appended claims, similarly, that the materials and finish of the several parts employed may be such as the manufacturer may decide or varying conditions or uses may demand.

Having thus described my invention, what I claim and desire to secure by Letters Patent is:

1. A shaker comprising a pair of compartments arranged in parallelism, a perforate closure at one end of each compartment provided with a plurality of spaced, small perforations, a removable, imperforate closure at the other end of each compartment, a disc valve for each perforate closure, a valve stem for each valve extending the length of each compartment and through the imperforate closure thereof, a bar connecting the outer ends of said valve stems and spring means compressed between each end of said bar and said imperforate closure to normally close said valves but to allow opening the same by depressing one or both ends of said bar.

2. A shaker comprising a pair of compartments arranged in parallelism, a bottom closure for each compartment provided with a plurality of spaced, small perforations, a single top closure having a handle and seated on but removable from the upper end of said shaker, a disc valve for each bottom closure disposed exteriorly thereof, a valve stem for each valve extending through the adjacent bottom closure, the adjacent compartment and the top closure, a bar connecting the upper ends of said valve stems and a coil spring encircling each valve stem and compressed between said bar and said top closure, said springs normally holding said top closure and valves in closed position but being depressible to open either.

KIM KEE LEONG.

REFERENCES CITED

The following references are of record in the file of this patent:

UNITED STATES PATENTS

| Number | Name | Date |
| --- | --- | --- |
| 897,453 | Byam | Sept. 1, 1908 |
| 1,007,294 | Kraft | Oct. 31, 1911 |
| 1,070,535 | Roclawski | Aug. 19, 1913 |
| 1,221,630 | Trautman | Apr. 3, 1917 |
| 1,437,345 | Marr | Nov. 28, 1922 |
| 1,473,552 | Gubich | Nov. 6, 1923 |
| 1,674,233 | Williams | June 19, 1928 |
| 1,772,041 | Harris | Aug. 5, 1930 |
| 2,179,624 | Graham | Nov. 14, 1939 |